G. E. BENCH.
FLEXIBLE COUPLING FOR SHAFTING.
APPLICATION FILED DEC. 27, 1918.
1,306,943.
Patented June 17, 1919.
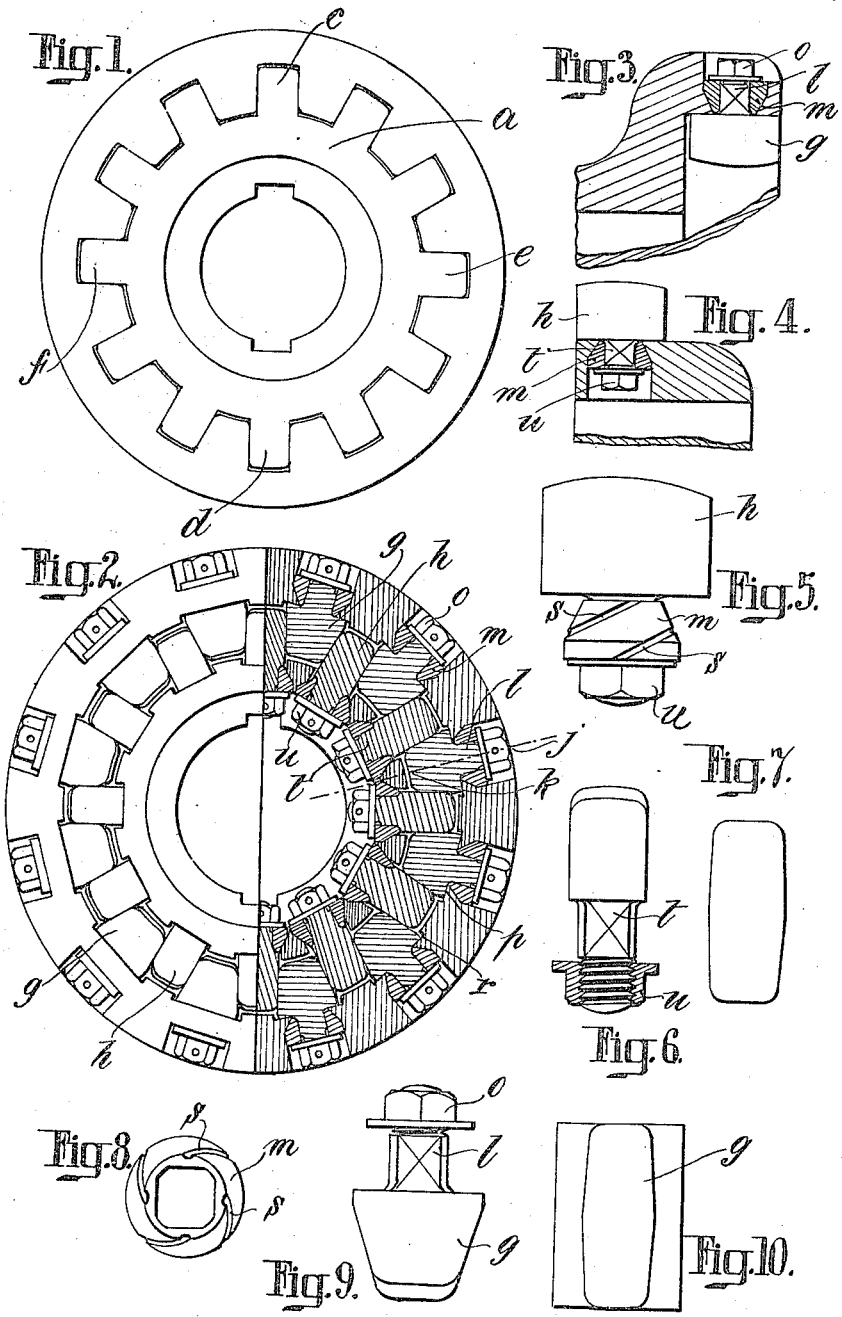
Inventor
George Edward Bench

UNITED STATES PATENT OFFICE.

GEORGE EDWARD BENCH, OF LEEDS, ENGLAND.

FLEXIBLE COUPLING FOR SHAFTING.

1,306,943.  Specification of Letters Patent.  Patented June 17, 1919.

Application filed December 27, 1918. Serial No. 268,476.

*To all whom it may concern:*

Be it known that I, GEORGE EDWARD BENCH, a subject of the King of Great Britain and Ireland, residing at Leeds, in the county of Yorkshire, England, have invented certain new and useful Improvements in Flexible Couplings for Shafting, of which the following is a specification.

This invention relates to devices called flexible couplings, which are interposed in a line of shafting; and refers to an improved construction of the device in question, suitable for general use with shafting subject to excessive vibration, but particularly useful in connecting the propelling machinery with the screw propeller of a ship, for preventing distortion of the shafting and derangement of the power unit as a result of the whipping action of the stern of a vessel of light structure when driven at a high speed.

The form of coupling at present in use for the purpose named, consists of two circular components, one a male portion provided with teeth or segments on its outer circumference, meshing into teeth or segments on the inner circumference of the female portion, which it fits exactly.

As, however, the teeth or segments are in each case made solid with their components, whatever flexibility exists is the result only of backlash in the engaging parts.

The coupling made according to my present invention is provided with teeth or segments, as already described, but instead of being made solid with their components, the teeth are separate units, each of which is capable of movement within prescribed limits around its radial axis. In addition, each tooth or segment is properly shaped so as to adapt itself to the altered position it should occupy, as a result of the movements of the shafting.

One constructional embodiment of my invention is illustrated in the accompanying drawing, in which:—

Figure 1 represents an end view of the existing type of flexible coupling.

Fig. 2 is a half elevation and half section of the improved form of flexible coupling—the subject of this invention.

Fig. 3 is a longitudinal section of parts of the outer or female component, showing one tooth in position.

Fig. 4 is a similar section of parts of the inner or male component showing one tooth in position.

Fig. 5 is a longitudinal elevation of the tooth in the inner component together with its cone plug showing oilways on the surface of the same.

Fig. 6 is an end view of a tooth in the inner component, showing the square shank $t$, with screw threaded portion and securing nut $u$.

Fig. 7 is a plan of a tooth of the inner component.

Fig. 8 is a plan of the cone plug, common to both forms of teeth.

Fig. 9 is an end view of a tooth of the outer or female component.

Fig. 10 is a plan of a tooth of the outer component.

Referring to Fig. 1: Supposing the inner or male component $a$, to be tilted in a vertical plane away from the observer, it is obvious that the teeth being rigid, only two of them, viz:—$c$ and $d$ are capable of unrestrained movement.

All the others, and especially those marked $e$ and $f$, will jam, the flexibility of the device being determined by the amount of backlash present.

On reference however to Fig. 2, it will be observed that each tooth, as at $g$ and $h$ is a separate unit capable of turning about a radial axis, as at $j$ $k$. For this purpose, each outer tooth is provided with a square shank $l$, Figs. 2, 3 and 9, which passes through a square hole in a conical plug $m$, secured by a nut $o$, which fits the screwed end of the shank and is furnished with a split pin, see Fig. 2. The base of each tooth is flat and rests upon a plane surface, $p$, upon which it turns, sufficient space being allowed for the maximum amount of axial movement, as at $r$.

The inner teeth $h$ are provided with square shanks $t$ passing through corresponding holes in the conical plugs $m$ and secured in position in the conical recesses in the inner component by means of nuts $u$.

If now the inner component be supposed to be tilted in a vertical plane away from the observer, it will be seen that each tooth is capable of adjusting itself to its altered position, and in doing so, it is found that the ends of the teeth on parts of each component gather together, and on the other parts open out, and as a consequence, they should be tapered as shown in Figs. 7 and 10, the degree of tapering depending upon the maximum amount of distortion of shaft alinement expected to obtain.

As the teeth and cones are separate units, it follows that they may be easily case hardened where required and made of iron if necessary, while the coupling components may be constructed of steel.

The lubrication of the rubbing surfaces of the cones is provided for by the oilways shown at *s*, Figs. 5 and 8, and the teeth being taper with rounded corners, ready access to the frictional surfaces may be secured by providing an oil trough for the coupling, within which it revolves.

It is to be understood that my invention is not limited to the particular construction herein described and shown on the accompanying drawing, but that it includes such modifications as fall within a fair interpretation of my claims.

What I claim as my invention and desire to secure by Letters Patent of the United States of America is:—

1. In a flexible coupling of the class described, the combination of an outer and an inner circular component, each provided with radial perforations, teeth projecting outwardly from the inner component and inwardly from the outer component and adapted to mesh with one another, the said teeth being provided with shanks passing into the radial perforations in the respective components and means for retaining the teeth in position while allowing for rotation about an axis radial with respect to the principal axis of the shaft, substantially as described.

2. In a flexible coupling of the class described, the combination of an outer and an inner circular component, circular radial perforations in the said components, each radial perforation in the outer component being formed with a contracted portion, toward the center of the component, and each radial perforation in the inner component being formed with a contracted portion away from the center of the component, teeth for the said components provided with shanks adapted to pass through the perforations and means for securing the teeth in position in the components, while allowing each tooth to turn about an axis radial with respect to the principal axis of the shaft substantially as described.

3. In a flexible coupling of the class described, the combination of an outer and an inner circular component, circular radial perforations in the said components, each radial perforation in the outer component being formed with a contracted taper toward the center of the component, and each radial perforation in the inner component being formed with a contracted taper away from the center of the component, teeth for each component adapted to intermesh, each tooth being provided with an enlarged head and with a square shank adapted to pass through one of the radial perforations, a plug for each tooth provided with a square perforation adapted to pass over the square shank and with a conical portion adapted to fit upon the tapering portion at the bottom of the perforation, a screw threaded portion at the end of the shank, and a nut adapted to screw on to the screw threaded portion at the end of the shank, all substantially as described.

4. In a flexible coupling of the class described, the combination of an outer and an inner component, circular radial perforations in the said components, each radial perforation in the outer component being formed with a contracted taper toward the center of the component, and each radial perforation in the inner component being formed with a contracted taper away from the center of the component, teeth for each component adapted to intermesh, each tooth being provided with an enlarged tapering head and with a square shank adapted to pass through one of the radial perforations, a plug for each tooth provided with a square perforation adapted to pass over the square shank and with a conical portion adapted to fit upon the tapering portion at the bottom of the perforation, oilways on the tapering surface of the plug, and a nut adapted to screw on to the screw threaded portion at the end of the shank, all substantially as described.

In testimony whereof I affix my signature in presence of two witnesses.

GEORGE EDWARD BENCH.

Witnesses:
   A. L. SIMONS,
   MARY C. MACKENZIE.